R. A. Boulware,

Corn Planter.

No. 112,894.  Patented Mar. 21, 1871.

Witnesses.  Inventor.
R. A. Boulware,
Chipman Hosmer & Co,
Attorneys.

United States Patent Office.

RICHARD A. BOULWARE, OF DONIPHAN, KANSAS.

Letters Patent No. 112,894, dated March 21, 1871.

IMPROVEMENT IN CORN-PLANTERS.

The Schedule referred to in these Letters Patent and making part of the same.

*To all whom it may concern:*

Be it known that I, RICHARD A. BOULWARE, of Doniphan, in the county of Doniphan and State of Kansas, have invented a new and valuable Improvement in Corn-Planters; and I do hereby declare that the following is a full, clear, and exact description of the construction and operation of the same, reference being had to the annexed drawing, making a part of this specification, and to the letters and figures of reference marked thereon—

Figure 1 of the drawing is a representation of a side view of my invention;

Figure 1:
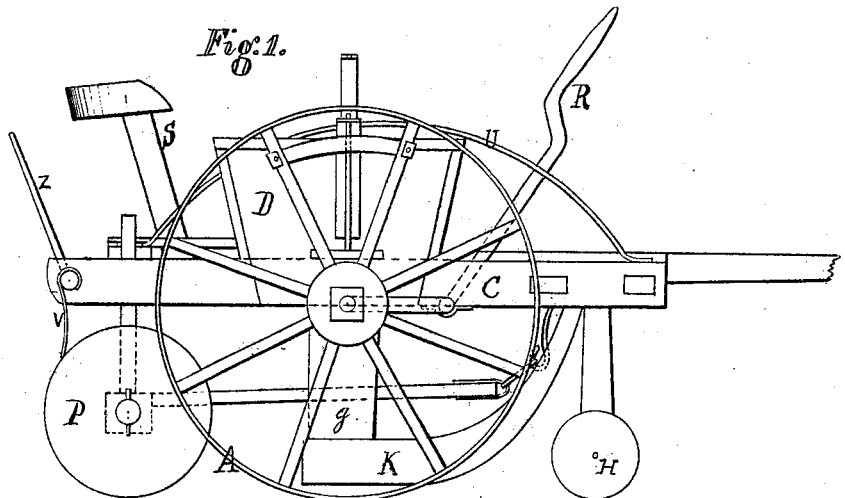

My invention relates to corn-planters, and consists in the construction and novel arrangement of devices intended to add to the usefulness and efficiency of such machines.

A of the drawing represents the wheels of my corn-planter, and B the axle thereof. It will be observed that each end of this axle is bent into the form of a crank, the object of which will be explained hereafter.

C represents a quadrangular frame arranged upon the axle, and

D the seed-boxes connected therewith.

E represents a sliding-bar, the respective ends of which are slotted, and are operated back and forth in the bottoms of the seed-boxes D, as shown.

Figure 2:
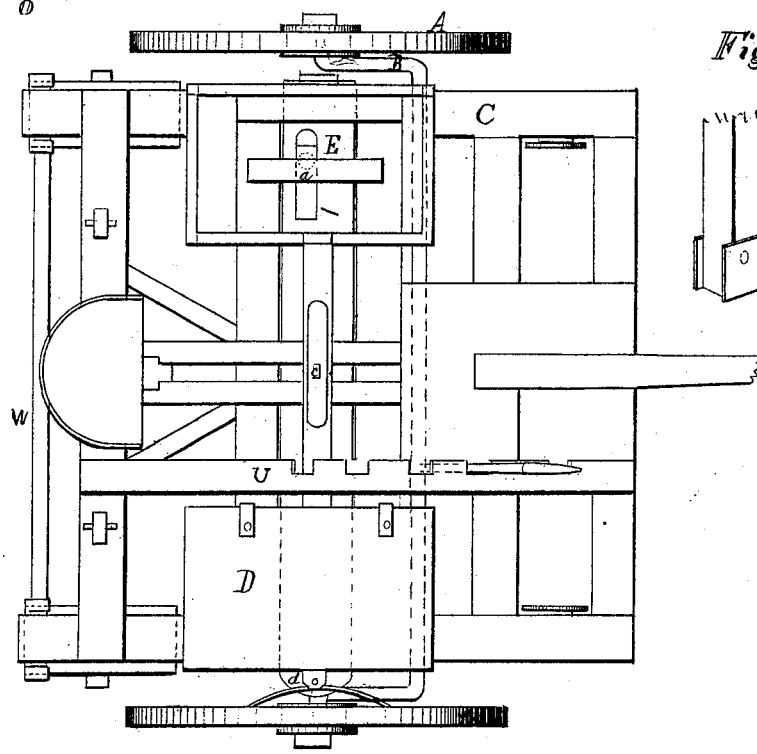
Figure 2 is a plan view of same.
Figure 3:
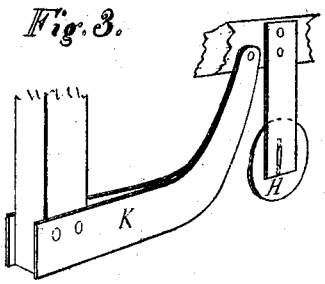
Figure 3 is a detail.

The letter $a$ is a slide placed in the slot of bar E, to open or close the passage-way for the seed at will. This sliding-bar E is operated by a lever at the point $c$, when desirable, or it may be operated automatically by the spokes of a wheel, in the manner shown at $d$, in fig. 2.

The end of the slide designed for operation with the wheel-spokes is rounded, as shown, and held against the spokes by a spring or otherwise. The result is necessarily an oscillating movement, which opens and closes the openings in the bottoms of the seed-boxes with each vibration, and allows the seed to pass downward through conduits $g$ to the ground.

H represents a cutting-roller, intended to make an opening in hard soil; and

K is a marker, that widens and enlarges the opening thus made, thereby forming a proper bed for the seed.

P represents concave rollers, or rather rollers having concave surfaces, which are designed and adapted to serve as crushers or pulverizers of the soil and covering of the seed.

R is a lever affixed to the carriage-axle, by means of which the driver, while sitting upon his seat at S, can raise or lower the carriage-frame at will.

To raise the frame, the operator draws the lever rearward, when, in consequence of the crank-shape of the respective ends of the axle, the entire frame is elevated.

The letter U is a notched bar, adapted to hold the lever R in any desired position.

W is a rotating-bar, attached to the rear end of the frame, as shown, to the respective ends of which are attached scrapers, $v$. This bar, and the scrapers, are operated by means of the lever $z$.

I claim as my invention—

1. The wheel H, in combination with the marker K, when constructed to operate substantially as and for the purpose specified.

2. The wheel H, in combination with the marker K and roller P, when constructed and arranged substantially as and for the purpose specified.

In testimony that I claim the above I have hereunto subscribed my name in the presence of two witnesses.

R. A. BOULWARE.

Witnesses:
 HENRY CORNELIUS,
 HENRY M. SWISHER.